United States Patent [19]

Ryan

[11] Patent Number: 4,695,901
[45] Date of Patent: Sep. 22, 1987

[54] METHOD AND APPARATUS FOR REMOVING PSEUDO-SYNC AND/OR AGC PULSES FROM A VIDEO SIGNAL

[75] Inventor: John O. Ryan, Cupertino, Calif.

[73] Assignee: Macrovision, Santa Clara, Calif.

[21] Appl. No.: 836,019

[22] Filed: Mar. 4, 1986

[51] Int. Cl.$^4$ .............................................. H04N 5/76
[52] U.S. Cl. ........................................ 380/5; 358/319;
358/335; 358/310; 360/37.1; 380/15
[58] Field of Search ............... 358/114, 120, 335, 310,
358/319; 360/37.1, 60

[56] References Cited

U.S. PATENT DOCUMENTS

| 3,029,306 | 4/1962 | Dolby . | |
|---|---|---|---|
| 3,197,559 | 7/1965 | Kihara . | |
| 3,359,365 | 12/1967 | Kihara . | |
| 3,439,113 | 4/1969 | Walker . | |
| 3,446,914 | 5/1969 | Hodge . | |
| 3,460,161 | 8/1969 | Waller et al. . | |
| 3,470,315 | 9/1969 | Kihara . | |
| 3,470,316 | 9/1969 | Kihara . | |
| 3,470,317 | 9/1969 | Kihara . | |
| 3,483,318 | 12/1969 | Iwai et al. . | |
| 3,488,433 | 1/1970 | Iwai et al. . | |
| 3,493,675 | 2/1970 | Iwai et al. . | |
| 3,504,116 | 3/1970 | Sato et al. . | |
| 3,517,127 | 6/1970 | Grace . | |
| 4,100,575 | 7/1978 | Morio et al. . | |
| 4,121,242 | 10/1978 | Janko . | |
| 4,163,253 | 7/1979 | Morio et al. | 358/120 |
| 4,213,149 | 7/1980 | Janko | 360/37.1 X |
| 4,390,898 | 6/1983 | Bond et al. . | |
| 4,467,358 | 8/1984 | Switsen . | |
| 4,475,129 | 10/1984 | Kagota . | |
| 4,483,183 | 12/1984 | Kinjo | 360/37.1 X |
| 4,571,642 | 2/1986 | Hofstein | 360/37.1 X |

FOREIGN PATENT DOCUMENTS 53-89715  8/1978  Japan .
2055501  3/1981  United Kingdom ............... 360/37.1

OTHER PUBLICATIONS

Video Magazine, pp. 88, 90, Jun. 1981.
High Fidelity, p. 54, Dec. 1982.
Showtime Specification Sheet–Video Stabilizer, VV–170S, 1982.
Television Engineering Handbook, pp. 19-10 to 19-12 (1969).

Primary Examiner—Robert L. Richardson
Attorney, Agent, or Firm—Cushman, Darby & Cushman

[57] ABSTRACT

Added pseudo-sync pulses and AGC pulses are removed from a video signal to enable acceptable video recording thereof. The added signals previously interfered with acceptable video recording of the video signal because the automatic gain control of videotape recorders sensed false recording levels, while conventional televisions receivers were unaffected by those modifications to the video signal. Removal of the added pulses permits acceptable video recording of the previously modified video signal. A selectively-operable clipping circuit is used to remove selected negative-value components (i.e. pseudo-sync pulses) from the video signal, while added AGC pulses are effectively blanked from the video signal with an electrically-operable switch. Both the blanking and clipping functions are selectively achieved by sensing both the normal sync pulses of the video signal and the added pseudo-sync pulses. Method and apparatus are disclosed for "cleaning up" video signals modified by either the pseudo-sync pulses alone, the AGC pulses alone, or combinations thereof.

31 Claims, 4 Drawing Figures

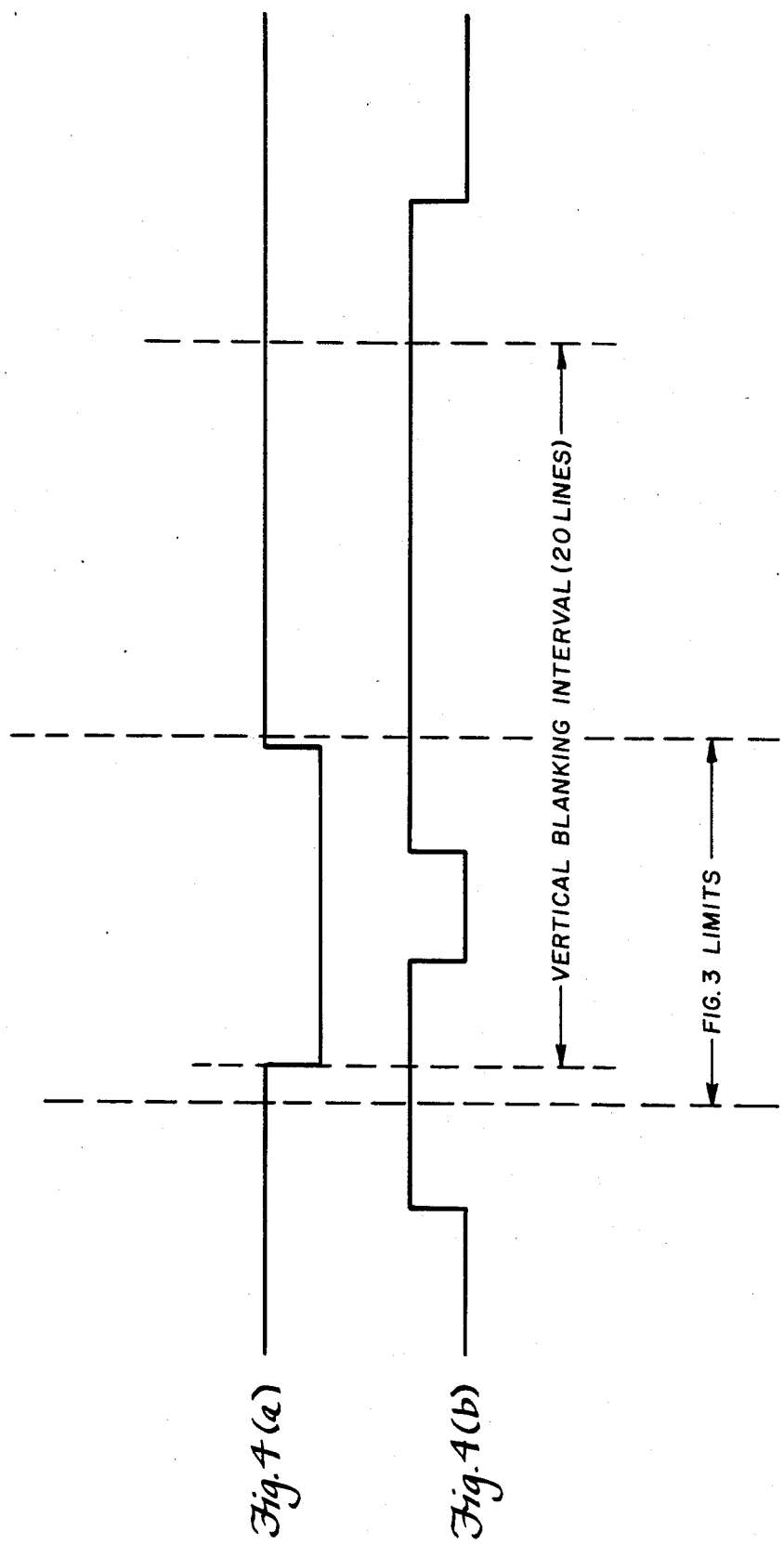

METHOD AND APPARATUS FOR REMOVING PSEUDO-SYNC AND/OR AGC PULSES FROM A VIDEO SIGNAL

BACKGROUND OF THE INVENTION

The present invention pertains to a method and apparatus for removing added pulses from a video signal to render copiable the video signal. More particularly, the present invention pertains to such a method and process for removing pseudo-sync pulses which have been added to a video signal, or AGC (positive) pulses added to a video signal for the purpose of inhibiting copying of the video signal. The present method and apparatus are also useful with various combinations of the added pulses stated above.

In a copending application by the present inventor entitled METHOD AND APPARATUS FOR PROCESSING A VIDEO SIGNAL SO AS TO INHIBIT THE MAKING OF ACCEPTABLE VIDEO TAPE RECORDINGS, Ser. No. 554,697, filed Nov. 23, 1983, and now abandoned, there is disclosed a method and apparatus for processing a video signal in a manner so as to inhibit the making of acceptable videotape recordings thereof. However, the processing of the video signals there disclosed is such that a conventional television receiver produces a normal color picture from the modified signal.

In another copending application by the present invention with the same title as above, Ser. No. 724,006, filed Apr. 7, 1985, and now U.S. Pat. No. 4,631,603 the same general objects and purposes of the Ser. No. 554,697 invention are also achieved. In other words, both of these inventions disclose how a video signal can be modified so that a television set produces normal video pictures from the modified signal, but a videotape recording made from the modified signal produces generally unacceptable pictures.

Both of the foregoing "inhibit" inventions rely on the addition of high level positive pulses (hereinafter referred to as AGC pulses) to the video signal, following the trailing edges of some percentage of the sync pulses. This pulse addition occurs during the back porch region of the video signal, i.e. within the blanking interval, in accordance with the first of those inventions. These added pulses cause the video signal level automatic gain control system in a videotape recorder to make an erroneous assessment of video signal level, thereby leading to an unacceptable or bad recording of the video signal.

According to the several inventions above, the sync pulses referred to can be either the normal sync pulses of the video signal (including both equalizing and broad pulses) or the pseudo-sync pulses added to the video signal in accordance with the second of those invention. The pseudo-sync signals, which extend from the blanking signal level of the video signal to the normal sync tip level, are added to the video signal during some of the lines of the vertical blanking interval. Alternatively, blanking interval lines may be added immediately preceding and/or following this normal vertical blanking interval. These added lines would then be especially blanked for the "inhibit" feature purpose. According to the method of these inventions, each of the pseudo-sync pulses will be followed respectively by an AGC pulse (i.e. positive pulse), whereas only a fraction of the normal sync pulses in a video signal would be expected to be followed by an AGC pulse.

OBJECTS AND SUMMARY OF THE INVENTION

This invention discloses a method and apparatus for removing from a video signal pseudo-sync and/or AGC pulses which have been added to inhibit recording of the video signal, in any format the added pulses may be present in a given modified video signal. Such removal thereby allows the video signal to be recorded normally. Hence, one object of this invention is to provide a method and apparatus for removing pseudo-sync and AGC pulses from a modified video signal so that a videotape recording may be normally made of the "cleaned-up" video signal.

The broader teachings of the present method and apparatus may take the form of different embodiments dependent upon a given modified video signal. However, in general, the present invention enables normal video recordings to be made of any modified video signals which have pseudo-sync pulses and/or AGC pulses added for the purpose of inhibiting recording of the modified video signal.

Briefly, in accordance with one form of the present invention, added AGC pulses are removed from the video signal by selective blanking of the video signal during predetermined time periods following the occurrence of sync pulses. Similarly, removal of added pseudo-sync pulses is accomplished by selective clipping of the negative-going pseudo-sync pulses based on sensing of the sync pulses, along with generation of a line frequency square wave.

The present invention encompasses both method and apparatus for achieving removal of any one of the foregoing types of pulses added for defeating recording, or any combination of such "inhibit" pulses.

Other objects and advantages of the present invention will appear from the following detailed description taken in conjunction with the accompanying drawings.

BRIEF DESCRIPTION OF THE DRAWINGS

FIGS. 2a-2i, 3a-3h and 4a and 4b illustrate various waveforms and timing periods associated with operation of the FIG. 1 apparatus.

DETAILED DESCRIPTION OF THE PREFERRED EMBODIMENTS

Figure 1:
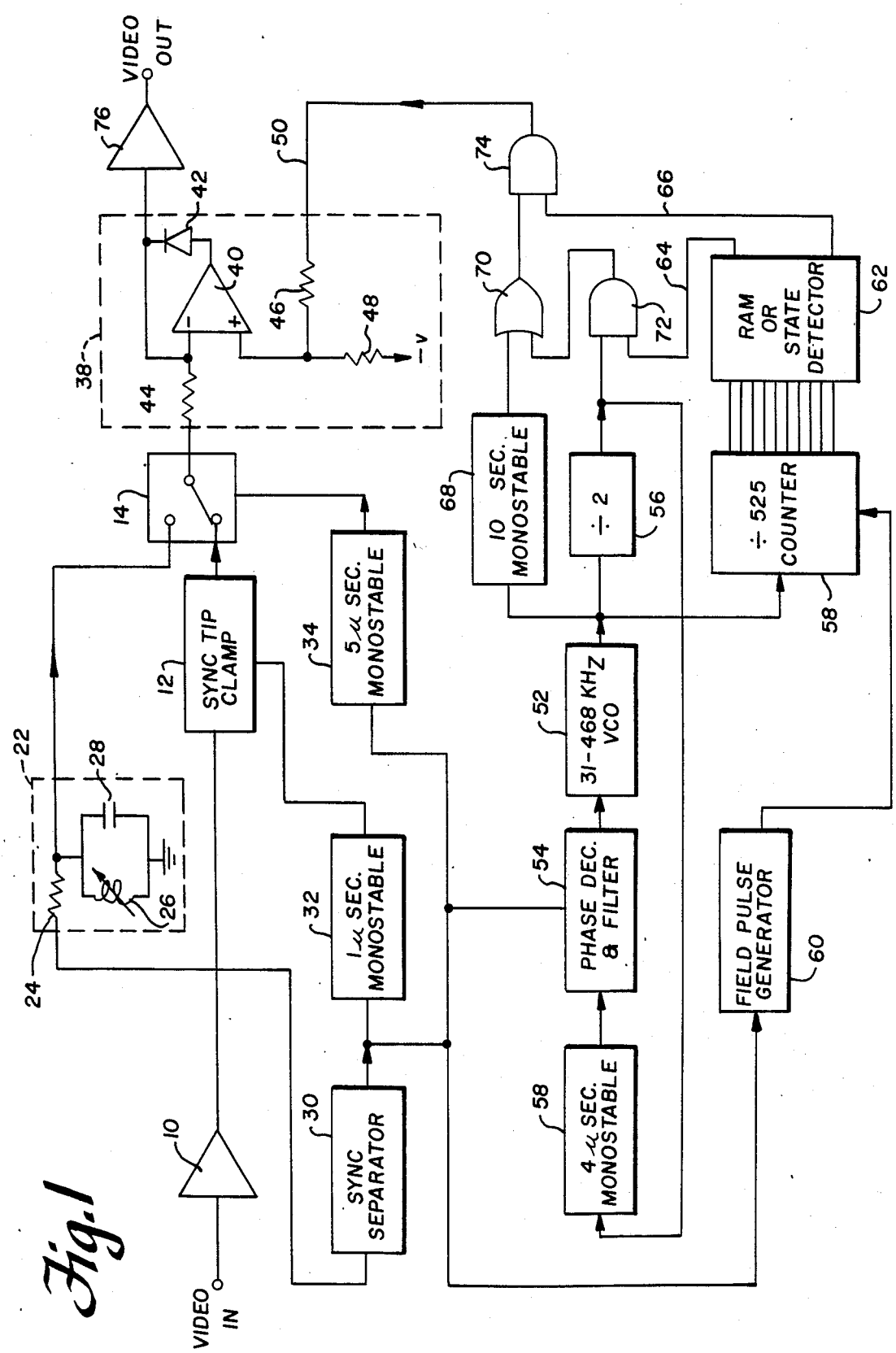
FIG. 1 is a block diagram of an examplary embodiment of an apparatus in accordance with one embodiment of the present invention.

Referring now to the block diagram of FIG. 1, the video signal which is input to buffer amplifier 10 is modified with the pseudo-sync pulses or the AGC pulses as discussed above. The buffer amplifier 10 may be a unity-gain amplifier which passes the video signal with its added pulses to a sync tip clamp 12. Clamp 12 causes the negative voltage sync tips of both the normally-occurring sync pulses and the added pseudo-sync pulses to be held at a constant negative voltage despite any variation in the average picture signal level, the amplifier gain levels, or other sources of bias. The clamping voltage of the sync tip clamp 12 is chosen so that the blanking-level voltage of the video signal at this point is 0 volts, or very close thereto. This fact require that the overall video signal level be fixed and known.

One of ordinary skill in the art might recognize that a clamp which is activated during the back porch blanking interval appears preferable to a sync tip clamp. This is due to the fact that the overall video level would not need to be known in order to insure that the blanking level is at 0 volts. Such an alternative clamping mechanism may be used as a feature of the present invention, provided that it is activated only during those back porch intervals which are free of AGC pulses. This added complexity might outweigh the advantages of such an alternative clamp. Hence, the embodiment of present FIG. 1 merely utilizes a sync tip clamp, as is known to one of ordinary skill in the art. Other elemental devices which are readily recognized and understood by one of ordinary skill in the art, such as the sync separator and the monostable multivibrators, are shown diagramatically only.

The output of sync tip clamp 12 is fed directly to one of the inputs of electrically-controlled switch 14. The output selection of switch 14 is controlled in accordance with the present invention to blank the positive AGC pulses from the video signal. A complete explanation of this feature is included below. FIG. 2(a) illustrates a video signal modified as dicussed to inhibit its being recorded, and as output by the sync tip clamp 12. Reference character 16 shows a normal sync pulse, while reference characters 18 illustrate pseudo-sync pulses in accordance with the "inhibiting" modifications made to a video signal. Reference characters 20 of FIGS. 2(a), (g), and (h) (i) show color burst information included in the normal video signal having color information. the teachings of the present invention are, of course, equally applicable to a "non-color" video signal.

The dotted box 22 of FIG. 1 represents a bandpass filter which is resonant at the color subcarrier frequency of the color burst information 20, and which has a Q-factor of about unity. This bandpass filter separates the color burst information from the AGC pulses by literally filtering out the AGC pulses in preference for the bandpass frequency color burst information, and the filter then applies the color burst to a second input of switch 14. Waveform 2(g) illustrates the waveform input to switch 14 from bandpass filter 22. The bandpass filter could, of course, be eliminated for monochrome applications of the present invention. The bandpass filter may be comprised of any known configuration, for example as shown in FIG. 1, including resistor 24, variable inductance 26 and capacitor 28 to constitute an RLC tuned circuit.

It should be noted that FIG. 2(g) clearly illustrates that the bandpass filter 22 outputs a signal level of 0 volts at all times other than the occurrence of color burst information. This "blanking" signal level is useful with switch 14 in regenerating an AGC-pulse-free video signal by the appropriate selection of the switch 14 input. This will be discussed more fully below.

The modified input video signal from buffer amplifier 10 also drives the sync separator 30. Sync separator 30 thus necessarily outputs signals indicative of both of the normal sync pulses 16 and the pseudo-sync pulses 18, as shown in FIG. 2(a). The leading edge of each such sync pulse (of either type: normal or pseudo) triggers the monostable multivibrator 32. The FIG. 1 embodiment shows a monostable multivibrator as being a 1 microsecond monostable; however, other time periods may be practiced in accordance with the present invention, as is true for virtually all the time periods herein disclosed in the exemplary embodiment.

The output of monostable multivibrator 32 is illustrated by the waveform of FIG. 2(b), which shows clearly by comparison with FIG. 2(a) that the leading edges of both normal sync pulses 16 and pseudo-sync pulses 18 trigger the monostable 32.

As seen in FIG. 1, the 1 microsecond output pulses from monostable 32 drive the sync tip clamp 12 so that the sync tips are clamped at a given voltage, as discussed above.

Triggering based on the trailing edge of each sync pulse is used in conjunction with monostable multivibrator 34, shown in the exemplary embodiment of FIG. 1 as a 5 microsecond monostable multivibrator. FIG. 2(c) illustrates the output of monostable multivibrator 34, and clearly shows that the indicated pulse output of monostable 34 is based on the trailing edge of the sync pulses of FIG. 2(a). These 5 microsecond monostable pulses of monostable 34 are used to drive the electrically-controlled switch 14. Switch 14 is arranged such that the output of bandpass filter 22 is connected to the output of switch 14 whenever the pulses of monostable 34 are high. Conversely, the output of sync tip clamp 12 is connected to the output of switch 14 whenever the pulses from monostable 34 are low.

As discussed in the present introduction, the AGC pulses (or positive pulses) occur only following sync pulses. Moreover, as used in the copending applications, the AGC pulses can occur only during the 5 microsecond intervals immediately following sync or psuedo-sync pulses. Therefore, selection of the bandpass filter 22 output during these 5 microsecond intervals immediately following sync pulses causes the output of switch 14 to be blanked so as to thereby remove the AGC pulses 36 of FIG. 2(a) from the video signal. The output of switch 14 is illustrated by the waveform FIG. 2(h), which shows that the AGC pulses 36 are removed at this point, but that the pseudo-sync pulses 18 are still in place. It should also be noted that the color burst information 20 is output by switch 14 (as shown in FIG. 2(h) since this color burst information is output by bandpass filter 22, and since it occurs during the follow-on 5 microsecond intervals during which switch 14 is connected to the bandpass filter 22 output.

The foregoing discussion of a selected portion of FIG. 1 discloses an appartus which could be used in isolation apart from the remaining circuitry of FIG. 1 to remove AGC pulses from a video signal, if that were all that was necessary to enable acceptable video recording of the video signal. In other words, the output of switch 14, appropriately buffered, could be used as the video output of the FIG. 1 apparatus, to be input to a video recorder, if removal of only the AGC pulses was deemed adequate.

The remaining circuitry of exemplary embodiment FIG. 1 is used primarily in removing pseudo-sync pulses from the modified video signal input to buffer amplifier 10. Hence, if a video signal modified with the addition of pseudo-sync pulses only (and no added AGC pulses) were processed, switch 14 could be held in its lower position (sync tip clamp input position) at all times to constitute circuitry which only removes pseudo-sync pulses. Of course, the exemplary embodiment of FIG. 1 removes only pseudo-sync pulses if those are the only sort of pulses added to a video signal. Likewise, the FIG. 1 apparatus removes only AGC pulses if only AGC pulses are added to a normal video signal. The whole of the FIG. 1 apparatus, however, removes both added pseudo-sync pulses and added AGC pulses where both are present.

To accomplish the removal of pseudo-sync pulses 18 from a modified video signal, the video signal from buffer amplifier 10 is ultimately processed through switch 14 (via either sync tip clamp 12 or bandpass filter 22) and is additionally processed by negative-peak clipper 38. The clipping level of clipper 38 may be variably set, and is determined by the voltage level applied to the non-inverting input of operational amplifier 40. Diode 42 and resistor 44 form a part of a well known clipping configuration for operational amplifier 40, and resistors 46 and 48 form a voltage divider network with voltage level input −V to complete the circuit 38.

The clipping level of clipper circuit 38 is variably established by particular selection of the voltage level which is presented to the non-inverting input of operational amplifier 40. Digital signals along lead line 50 (or, alternatively, analog signals of appropriate high and low level) are used to control the variable setting of negative voltage clipping for operational amplifier 40. Generation of a switch control signal on lead line 50 is discussed further below.

Clipper 38 functions as follows. Operational amplifier 40 will not transmit signal voltage excursions more negative than the voltage at its non-inverting terminal. Therefore, if the voltage at this non-inverting terminal is set to 0 volts, then all sync pulses (e.g. normal sync pulses) and other negative excursions (e.g. pseudo-sync pulses) are removed from the video signal. If, however, this voltage is set to approximately −0.5 volts, then the video signal passes through clipper 38 without modification since no components of the video signal at the output of switch 14 are more negative than −0.3 volts. Refer to the voltage levels indicated in FIG. 2(i). Operation of sync tip clamp 12 enables this precise negative voltage limit setting. Resistors 46 and 48 constitute a divider circuit which along with the bias voltage −V functions to convert the high/low logic voltage signal levels present on lead line 50 to 0 and −0.5 volts, respectively.

Therefore, clipper 38 actually functions as a negative-peak clipper circuit only when the signal level on lead line 50 is high. In other words, a "high" signal on lead line 50 is converted by resistors 46 and 48 and bias voltage −V to a 0 volt input to the non-inverting terminal of operational amplifier 40. During such an input, all voltages which extend negatively below 0 volts are truncated or clipped from the output of clipper 38.

The remaining circuitry illustrated in the lower half of FIG. 1 is concerned with generating an appropriate pulse train on lead line 50 so as to cause clipper 38 to remove all negative excursions from the video signal except those which are attributable to normal sync pulses. The resulting output of clipper 38 when operated with such an appropriate pulse train, therefore, is a video signal which has had all added pseudo-sync pulse and AGC pulse pairs (or individual pulses) removed to permit acceptable video recording of the resulting output.

Referring again to FIG. 1, voltage controlled oscillator 52 operates at twice the line frequency of the video signal (i.e., 31.468 kilohertz). This oscillator is phase locked by phase detector and filter 54 with the leading edges of the normal sync pulses output by sync separator 30. Divider 56 and 4 microsecond monostable 58 function with phase detector and filter 54 in a known fashion to provide the phase lockup for voltage controlled oscillator 52. FIG. 2(d) illustrates the line frequency square wave which is output by the voltage controlled oscillator 52 through the divider 56. In other words, FIG. 2(d) illustrates the waveform output by divider 56.

Figure 2:
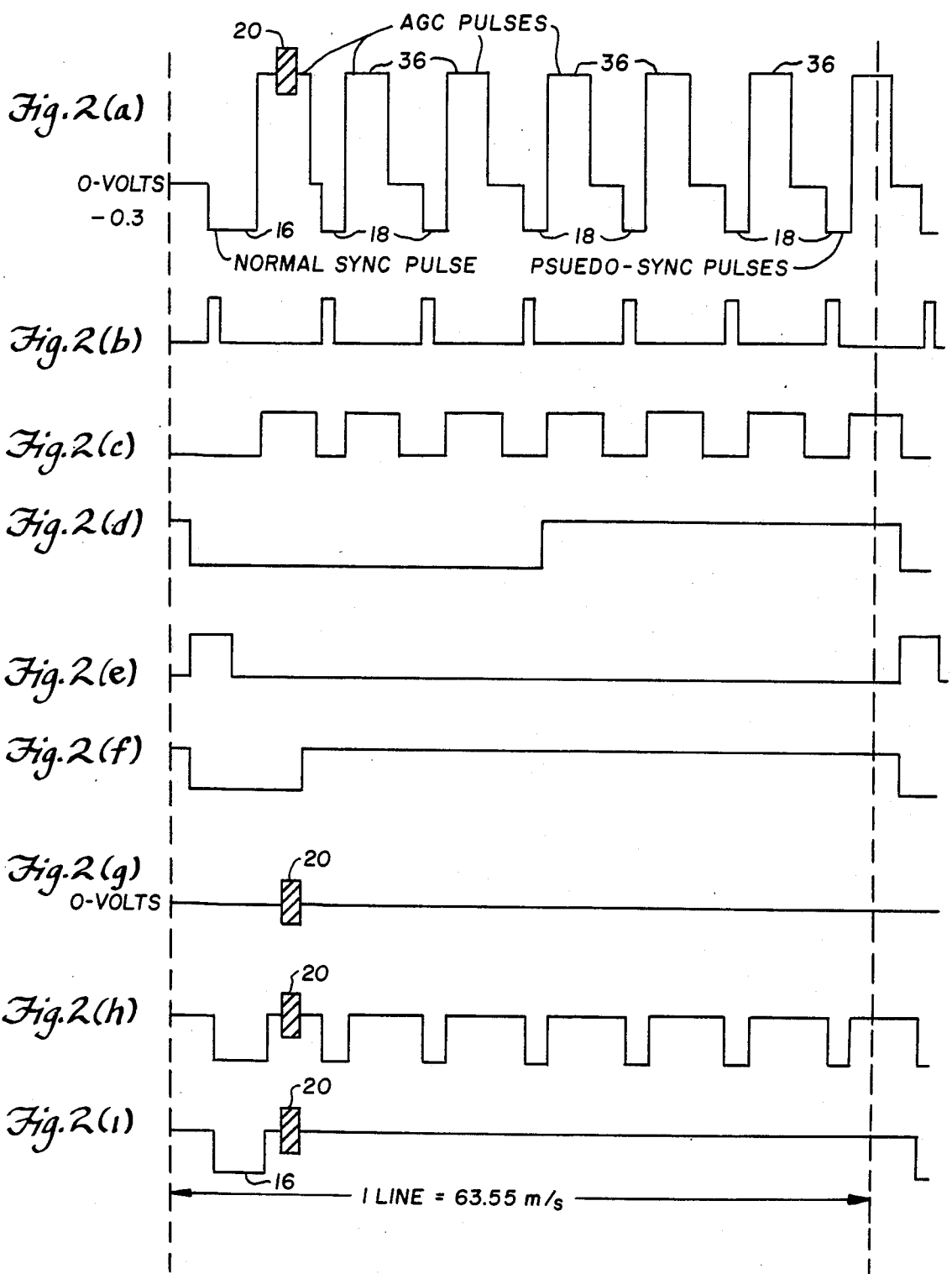

The negative-going edges of the waveform of FIG. 2(d) trigger the pulse outputs of 4 microsecond monostable 58. FIG. 2(e) illustrates the waveform which is output by the 4 microsecond monostable 58. These pulses shown in FIG. 2(e) sample the leading edges of the sync pulses from sycn separator 30 in the phase detector and filter 54. Transfer characteristics of this phase detector and filter and voltage controlled oscillator are chosen so that the oscillator 52 locks up in the phase relation shown with the various waveforms of FIG. 2. The detailed design of this phase locked loop is considered well known to one of ordinary skill in the art, and need not therefore be discussed in detail at this point. It should be noted, however, that the phase detection system including monostable 58 and phase detector and filter 54 prevents the phase locked loop from being disturbed by the occurrence of the pseudo-sync pulses 18.

FIG. 3(a) illustrates the timing sequence of various lines in a given video signal field. FIG. 3(b) then illustrates a train of normal synchronizing pulses in the vertical sync region of a picture transmission. FIG. 3(g) illustrates that waveform needed on lead line 50 of FIG. 1 to permit the pulse illustrated in FIG. 3(b) to pass without being clipped by clipper circuit 38. Hence, generation of the waveform illustrated in FIG. 3(g) is a particular feature of the present invention, and is derived in one exemplary fashion as follows. Of course, any other circuitry which also generates the waveform shown in FIG. 3(g) is included within the spirit and scope of the broader teachings of this invention.

The pulses from voltage controlled oscillator 52 having a frequency twice that of line frequency are counted up by the ten-bit counter 58. Counter 58 is reset to 0 by an output from field pulse generator 60. Field pulse generator 60 receives its input from sync separator 30, and effectively flags the completion of each field of the video signal. See FIG. 3(h) which shows a single pulse occurring at the beginning video signal line, designated as line segment 0 in FIG. 3(a). The data lines from counter 58 are connected to the address inputs of a read only memory device (ROM) 62, which essentially functions as a state detector in the present apparatus. In other words, ready only memory 62 is organized as a 1024 by 2 array, and programmed to provide certain signals at its two respective outputs on lead lines 64 and 66, respectively, which signals selectively correspond to the occurrence of particular video signal lines (i.e., states). These first and second respective outputs are illustrated in waveform in FIGS. 3(e) and 3(f), respectively. The signals illustrated by the waveforms of FIGS. 3(a) and 3(f) are used with the remaining logic elements of FIG. 1 to produce the necessary control signal on lead line 50, as shown in FIG. 3(g) and discussed above, to achieve proper function of clipper circuit 38.

The time intervals shown in FIG. 3(a) are related with the address states in the vertical sync region, and as designated in conjunction with the state detector (ROM) 62. It should be noted that state 0 of the FIG. 3(a) intervals corresponds to the field reset pulse of FIG. 3(h).

Ten microsecond monostable multivibrator 68 is serially connected in line between the output of voltage controlled oscillator 54 and one input of OR gate 70. OR gate 70 has as its other input the output of AND gate 72. The two inputs of AND gate 72 are derived from the output of divider 56 (the waveform of FIG. 2(d) and the first output on lead line 64 of state detector 62 (the waveform of FIG. 3(e). The output of OR gate 70 is then used as one of the inputs for AND gate 74, with the second output on lead line 66 of state detector 62 (the waveform of FIG. 3(f) serving as the other input thereof. These two signals are "anded" together in AND gate 74 to obtain on lead line 50 the desired waveform as illustrated in FIG. 3(g). Confirmation of this FIG. 3(g) output may be made by one of ordinary skill in the art by comparison inspection of the following four waveforms: FIG. 2(d) (which illustrates the output waveform of divider 56), FIG. 3(a) (which illustrates the first output of state detector 62 as present on lead line 64), FIG. 3(c) (which illustrates the output of monostable multivibrator 68 which is input to OR gate 70) and FIGS. 3(f) and 4(b) (which illustrate on two respective time scales the second output of state detector 62 as present on lead line 66). Using these four basic waveforms, and performing the designated operations of AND gates 72 and 74 and OR gate 70, the appropriate FIG. 3(g) waveform is obtained for proper control of operational amplifier 40 to enable deletion of the negative-going pseudo-sync pulses.

Figure 3:

The waveforms of FIGS. 3(e) and 3(f), respectively, are reproduced on a broader time scale in the waveforms of FIGS. 4(a) and 4(b). As seen at the bottom of FIG. 2, the entire time frame of the FIG. 2 contents includes the equivalent of one video signal line (or 63.55 microseconds). FIG. 3 discloses a number of "half-lines" 515 through 10. FIG. 4 marks in dotted lines the vertical blanking interval of twenty lines (or forty half-lines or "states"), and also shows in other dotted lines the time limit boundaries of the FIG. 3 illustration.

From FIG. 4, it may be readily seen that the clipping action of clipper circuit 38 is disabled for most of the active field except for a few lines on either side of the vertical blanking inerval where pseudo-sync pulses may be used. This prevents clipping of normal chroma information which can extend below the blanking level. The clipper circuit 38 is also disabled during the three lines of the vertical blanking interval during which the normal broad sync pulses occur.

Referring finally to FIG. 2(i), the output of buffer amplifier 76 is illustrated, which output shows retention of the normal sync pulse 16 and color burst information 20, but removal of the pseudo-sync pulses 18 and AGC pulses 36 to thereby permit the making of an acceptable videotape recording to the FIG. 2(i) video signal.

As alluded to above, in practice it may be sufficient to remove most of the AGC pulses without the necessity of removing all AGC pulses. Alternatively, and depending on precisely how the original video signal was modified, it may be sufficient to simply remove most of the pseudo-sync pulses. For that reason, the foregoing disclosure explains the several few minor modificiations to the FIG. 1 embodiment which permit the selective removal of either the pseudo-sync pulses or the AGC pulses, as well as any combinations thereof. Likewise, one of ordinary skill in the art will readily appreciate and understand those minor modifications to FIG. 1 which might be necessary and desirable to cause elimination of some percentage of the AGC pulses or pseudo-sync pulses without the necessity of removing all such pulses. Also, a functional embodiment of this invention might reduce the amplitude of some of the added pulses (e.g., reduce the amplitude of the AGC pulses by 70 percent) as opposed to removing them entirely. All such modifications and variations are intended to fall within the scope and spirit of the present invention, which is further set forth in the appended claims.

What is claimed is:

1. A method of removing pseudo-sync pulses added after normal sync pulses to a video signal for inhibiting the making of acceptable video recordings of the video signal, comprising the steps of:
    providing a selectively-operable negative-peak clipping device to pass unchanged the video signal in one operation state thereof and to pass the video signal with selected negative-value components thereof removed in a second operation state thereof;
    detecting normal sync pulses and pseudo-sync pulses of the video signal;
    selectively operating the clipping device in accordance with the detected sync pulses so that the video signal is padded by the clipping device unchanged during the detection of normal sync pulses and passed by the clipping device as modified by the second operation state thereof during the detection of at least some of the pseudo-sync pulses, thereby outputting a video signal which is regenerated free from at least some of the added pseudo-sync pulses to permit more acceptable video recordings thereof.

2. A method as in claim 1, wherein the operating step includes the step of providing a phase-locked loop responsive to the leading edges of only the normal sync pulses, the loop having a voltage-controlled oscillator with a frequency twice that of the line frequency of the video signal.

3. A method as in claim 2, wherein the operating step also includes the step of dividing an output of the voltage-controlled oscillator by two to thereby provide the basis for a regenerated normal sync pulse for each line of the video signal.

4. A method of removing AGC pulses added after sync pulses to blanking intervals of a video signal for inhibiting the making of acceptable video recordings of the video signal, comprising the steps of:
    sensing the sync pulses;
    regenerating the video signal for a given period of time after sensing the sync pulses in a manner attenuating at least some of the AGC pulses; and
    passing the video signal unchanged at other times, whereby the resulting composite video signal has at least some of the added AGC pulses attenuated to permit more acceptable video recordings thereof.

5. A method as in claim 4 wherein the sync pulses include both normal sync pulses and added pseudo-sync pulses.

6. A method as in claim 4, wherein said regenerating step includes the step of filtering and outputting the color burst information from the video signal and selectively applying the same to the composite video signal.

7. A method as in claim 6, wherein said filtering step includes holding its output at a predetermined value at all times other than the occurrence of color burst information in the video signal, whereby application of the filtering step output to the composite video signal achieves the regenerating of the video signal.

8. A method as in claim 7, wherein the predetermined value falls within a range of zero to 30 percent of the amplitude value of the AGC pulses being attenuated.

9. A method as in claim 4, wherein the regenerating step is responsive to all of the sync pulses.

10. A method as in claim 5, wherein at least some of the added pseudo-sync pulses are removed from the resulting composite video signal to permit more acceptable video recordings thereof.

11. The method of removing pseudo-sync and AGC pulses pairs added to blanking intervals of a video signal for inhibiting the making of acceptable video recordings of the video signal, comprising the steps of:
providing a sync separator to output normal sync pulses of the video signal and the added pseudo-sync pulses;
using the separated sync pulses of both types to blank following AGC pulses from the video signal;
regenerating a normal sync pulses in synchronism with the video signal;
selectively controlling a variable negative-peak clipping device in accordance with the regenerated sync pulse to pass the normal sync pulses while clipping the pseudo-sync pulses from the video signal, thereby outputting a video signal which is free from the added pseudo-sync and AGC pulses pairs to permit acceptable video recording thereof.

12. A method as in claim 11, further comprising the steps of:
filtering the color burst information from the video signal; and
reinserting the filtered color burst information into the video signal after each separated normal sync pulse.

13. An apparatus for removing pseudo-sync pulses added to blanking intervals of a video signal for inhibiting the making of acceptable video recordings of said video signal, comprising:
controllable variable negative-peak clipper means for passing video signals unchanged in a first operational state thereof and for passing video signals with selected negative-value components thereof removed in a second operational state thereof;
input means for inputting said video signal to said clipper means;
sync detector means for detecting normal sync pulses of said video signal and said pseudo-sync pulses;
control means, responsive to said detected sync pulses for placing said clipper means in its first operational state in response to detection of a normal sync pulse and for placing said clipper means in its second operational state during occurrence of pseudo-sync pulses whereby said clipper means outputs a video signal having at least some of said pseudo-sync pulses removed therefrom to permit more acceptable video recordings thereof.

14. An apparatus as in claim 13, wherein said control means includes:
a voltage-controlled oscillator phase-locked to leading edges of said detected sync pulses;
a divider for dividing the output of said oscillator; and
logic means, responsive to the output of said divider, for outputting a control signal to said clipper means for thereby selectively placing said clipper means in one of its two states.

15. An apparatus for removing AGC pulses added during a predetermined time period after sync pulses to blanking intervals of a video signal for inhibiting the making of acceptable video recordings of said video signal, comprising:
controllable switch means, responsive to a control signal, for selectively connecting one of two inputs to an output thereof, said two inputs having said video signal and a predetermined blanking reference input thereto, respectively;
sensing means for sensing said sync pulses; and
control signal generating means, responsive to said sensing means, for outputting to said switch means said control signal so as to connect said blanking reference input to said output thereof for a period of time including the predetermined time period after the occurrence of said sync pulses, and so as to connect said video signal input to said output thereof at other times, whereby at least some of the AGC pulses of the video signal output from said switch means are attenuated to the level of the predetermined blanking reference to permit more acceptable video recordings thereof.

16. An apparatus as in claim 15 wherein said sync pulses comprise both normal sync pulses of said video signal and said pseudo-sync pulses.

17. An apparatus as in claim 15, further comprising:
color burst filter means connected between said video signal and said blanking reference input for passing color burst information from said video signal to said switch means and at all other times providing to said switch means said predetermined blanking reference.

18. An apparatus as in claim 17, wherein said predetermined blanking reference has a value falling within a range of zero to thirty percent of the amplitude value of said AGC pulses.

19. An apparatus as in claim 16, further including variable negative-peak clipper means, responsive to said sensing means, for selectively clipping said pseudo-sync pulses from said video signal to permit more acceptable video recordings of said video signal.

20. An apparatus for removing psuedo-sync and AGC pulse pairs added to blanking intervals of a video signal for inhibiting the making of acceptable video recordings of said video signal, comprising:
sensing means for sensing said pseudo-sync pulses and normal sync pulses of said video signal;
switching means, responsive to said sensing means, for blanking said AGC pulses from said video signal;
control pulse means, responsive to said sensing means, for outputting a control signal related to pseudo-sync pulse removal; and
variable clipping means, responsive to said control signal, for selectively removing said pseudo-sync pulses from said video signal, wherein
said resulting video signal has said pseudo-sync and AGC pulse pairs removed therefrom to permit acceptable video recording thereof.

21. An apparatus as in claim 20, further comprising filter means for extracting color burst information from said video signal for the subsequent addition thereof to said resulting video signal, and for providing a blanking reference signal for said switching means.

22. An apparatus as in claim 21, further including sync tip clamp means, connected in series between said video signal and said switching means and responsive to said sensing means, for holding the sync tips of said video signal at a constant negative voltage.

23. An apparatus as in claim 20, wherein said control pulse means includes:
   oscillator means for outputting a line frequency square wave;
   counter and state detector means, responsive to said oscillator output, for monitoring video signal line states; and
   logic means, responsive to said oscillator and said state detector means, for outputting said control signal.

24. An apparatus as in claim 23, further comprising field pulse generator means, responsive to said sensing means, for resetting said counter and state detector means whenever a field of said video signal is completed.

25. A method of modifying a video signal to which pulses have been added after normal sync pulses for inhibiting the making of acceptable video recordings of the video signal, comprising:
   sensing the normal sync pulses;
   removing added pulses occurring after normal sync pulses; and
   passing the video signal unchanged at other times, whereby the resulting composite video signal has added pulses removed therefrom to permit more acceptable video recordings thereof.

26. A method as in claim 25, wherein the added pulses occur during predetermined time periods after normal sync pulses, and said removing includes limiting the video signal to a predetermined value during time periods including the predetermined period of time.

27. A method as in claim 25 wherein the video signal added pulses are psuedo-sync pulses.

28. A method as in claim 25 wherein the video signal added pulses are AGC pulses.

29. A method as in claim 25 wherein the video signal added pulses are pulse pairs, each pair including a psuedo-sync pulse followed immediately by an AGC pulse.

30. A method as in claim 25 wherein the added pulses occur during vertical blanking intervals, said method further including sensing the vertical blanking interval, said removing including removing added pulses occurring during vertical blanking intervals.

31. A method as in claim 30 wherein the added pulses occur during predetermined time periods after normal sync pulses, and said removing includes limiting the video signal to a predetermined value during time periods including the predetermined period of time.

* * * * *

REEXAMINATION CERTIFICATE (1364th)
United States Patent [19]
Ryan

[11] B1 4,695,901
[45] Certificate Issued  Oct. 2, 1990

[54] METHOD AND APPARATUS FOR REMOVING PSEUDO-SYNC AND/OR A AGC PULSES FROM A VIDEO SIGNAL

[75] Inventor: John O. Ryan, Cupertino, Calif.

[73] Assignee: Macrovision, San Jose, Calif.

Reexamination Request:
No. 90/001,958, Oct. 2, 1990

Reexamination Certificate for:
Patent No.: 4,695,901
Issued: Sep. 22, 1987
Appl. No.: 836,019
Filed: Mar. 4, 1986

[51] Int. Cl.$^5$ ............................................. H04N 5/76
[52] U.S. Cl. ........................................ 380/5; 358/319; 358/310; 358/335; 360/37.1; 380/15
[58] Field of Search .................... 358/335; 360/37.1; 380/5, 10, 15

[56] References Cited

U.S. PATENT DOCUMENTS

| | | |
|---|---|---|
| 2,286,450 | 6/1942 | White et al. |
| 2,492,943 | 12/1949 | White |
| 2,885,470 | 5/1959 | Bartelink |
| 3,029,306 | 4/1962 | Dolby |
| 3,383,463 | 5/1968 | Goodell et al. |
| 3,493,674 | 2/1970 | Haughton |
| 3,514,533 | 5/1970 | DeWeger |
| 3,532,808 | 10/1970 | Fujisawa |
| 3,723,637 | 3/1973 | Fujio et al. |
| 4,134,126 | 1/1979 | Hirai |
| 4,191,969 | 3/1980 | Briand et al. |
| 4,336,554 | 6/1982 | Okada et al. |
| 4,459,613 | 7/1984 | Fareudja |
| 4,468,687 | 8/1984 | Munezawa et al. |
| 4,479,150 | 10/1984 | Ilmer et al. |

FOREIGN PATENT DOCUMENTS
53-97922 of 0000 Japan .

OTHER PUBLICATIONS

Tektronix Instruction Manual.
Tektronix Products Catalog.
3M Minicom Color Processor DP-100 Instruction Manual.
Article, Mar. 1959, pp. 117–123, "A Deleter–Adder Unit", Author: Popkin–Clurman and Dairdoff.
Article, Nov. 1958, pp. 726–729, "The Video Processing Amplifier in the Ampex Videotape Recorder", Author: Dolby.
Sony SL–5800 Service Manual.
JX–C7 Service Manual (No. 70023/May 1985).
EIA Standard EIA–170 Manual, (Rev. TR–135), (Nov. 1957).
Japanese Language JX–C7 Manual and Supplement.
Japanese Magazine Advertisements for JX–C7.
Article, (SMPTE), pp. 395–401, Jun. 1960, vol. 69, No. 6, "A Verticle Aperture Equalizer for Television", Author: Gibson and Schroeder.

*Primary Examiner*—Robert L. Richardson

[57] ABSTRACT

Added pseudo-sync pulses and AGC pulses are removed from a video signal to enable acceptable video recording thereof. The added signals previously interfered with acceptable video recording of the video signal because the automatic gain control of videotape recorders sensed false recording levels, while conventional televisions receivers were unaffected by those modifications to the video signal. Removal of the added pulses permits acceptable video recording of the previously modified video signal. A selectively-operable clipping circuit is used to remove selected negative-value components (i.e. pseudo-sync pulses) from the video signal, while added AGC pulses are effectively blanked from the video signal with an electrically-operable switch. Both the blanking and clipping functions are selectively achieved by sensing both the normal sync pulses of the video signal and the added pseudo-sync pulses. Method and apparatus are disclosed for "cleaning up" video signals modified by either the pseudo-sync pulses alone, the AGC pulses alone, or combinations thereof.

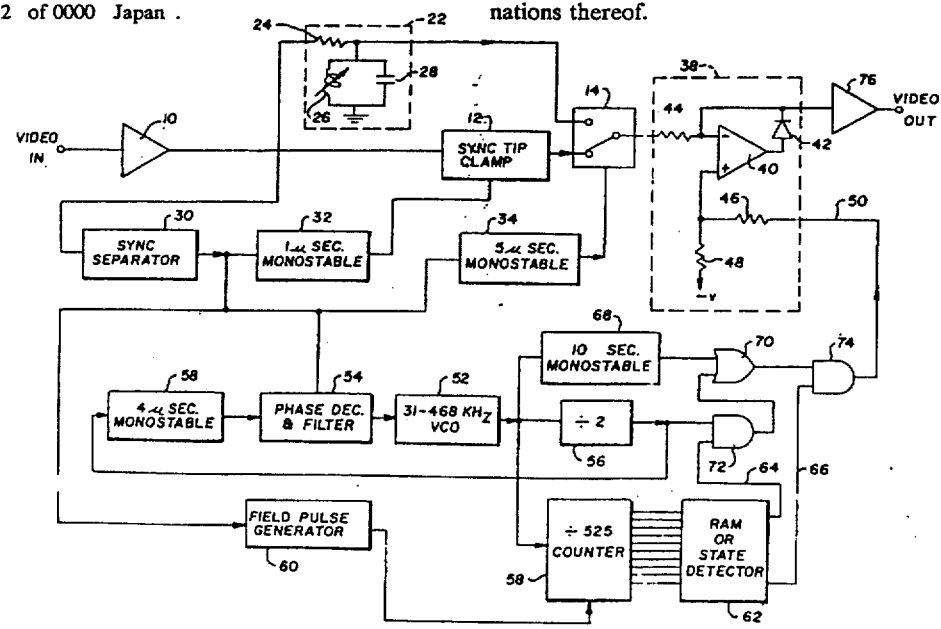

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-31 is confirmed.

* * * * *